United States Patent [19]
McDowell

[11] Patent Number: 5,653,033
[45] Date of Patent: Aug. 5, 1997

[54] RECHARGEABLE UNIVERSAL DRYWALL CUTTER

[76] Inventor: Tommy M. McDowell, 521 Rebecca Dr., St. Charles, Mo. 63301

[21] Appl. No.: 520,224

[22] Filed: Aug. 28, 1995

Related U.S. Application Data

[63] Continuation of Ser. No. 228,386, Apr. 15, 1994, abandoned.

[51] Int. Cl.⁶ .............................. B23D 45/16; B27B 9/00
[52] U.S. Cl. .................... 30/390; 30/505; 30/DIG. 1
[58] Field of Search ............................. 30/388, 389, 390, 30/391, 505, DIG. 1; 125/13.01

[56] References Cited

U.S. PATENT DOCUMENTS

| | | | |
|---|---|---|---|
| 1,124,552 | 1/1915 | Suggs | 30/388 |
| 1,175,963 | 3/1916 | Loeser | 30/390 |
| 1,806,582 | 5/1931 | Beutner | 30/390 |
| 1,816,966 | 8/1931 | Gray et al. | 30/390 |
| 2,274,421 | 2/1942 | Lindstrom et al. | 30/390 X |
| 2,617,186 | 11/1952 | Pickles | 30/390 X |
| 2,898,957 | 8/1959 | Demarkis | 30/390 X |
| 3,468,350 | 9/1969 | Logan | 30/391 X |
| 3,656,468 | 4/1972 | Welden | 125/13.01 |
| 4,249,313 | 2/1981 | Bates | 30/391 |
| 4,972,588 | 11/1990 | Briach, Sr. | 30/388 |
| 5,012,582 | 5/1991 | Bristol et al. | 30/390 |

FOREIGN PATENT DOCUMENTS

| | | | |
|---|---|---|---|
| 59067 | 6/1925 | Sweden | 30/388 |
| 688661 | 3/1953 | United Kingdom | 30/390 |

*Primary Examiner*—Eugenia Jones
*Attorney, Agent, or Firm*—Polster, Lieder, Woodruff & Lucchesi, L.C.

[57] ABSTRACT

A hand-held cordless power tool housing an onboard battery powered motor driving a power take-off gear, meshing with a driven gear on a shaft extension carrying a bevel drive gear meshing with an enlarged bevel gear for driving a cutting disc in a counterclockwise direction, and housing enclosing structure carrying the enlarged bevel gear to drive the work engaging cutter disc. The power tool is structured to control the depth of cut in a work piece of the cutting disc, and carries a roller element to ride on a work piece during cutting.

4 Claims, 2 Drawing Sheets

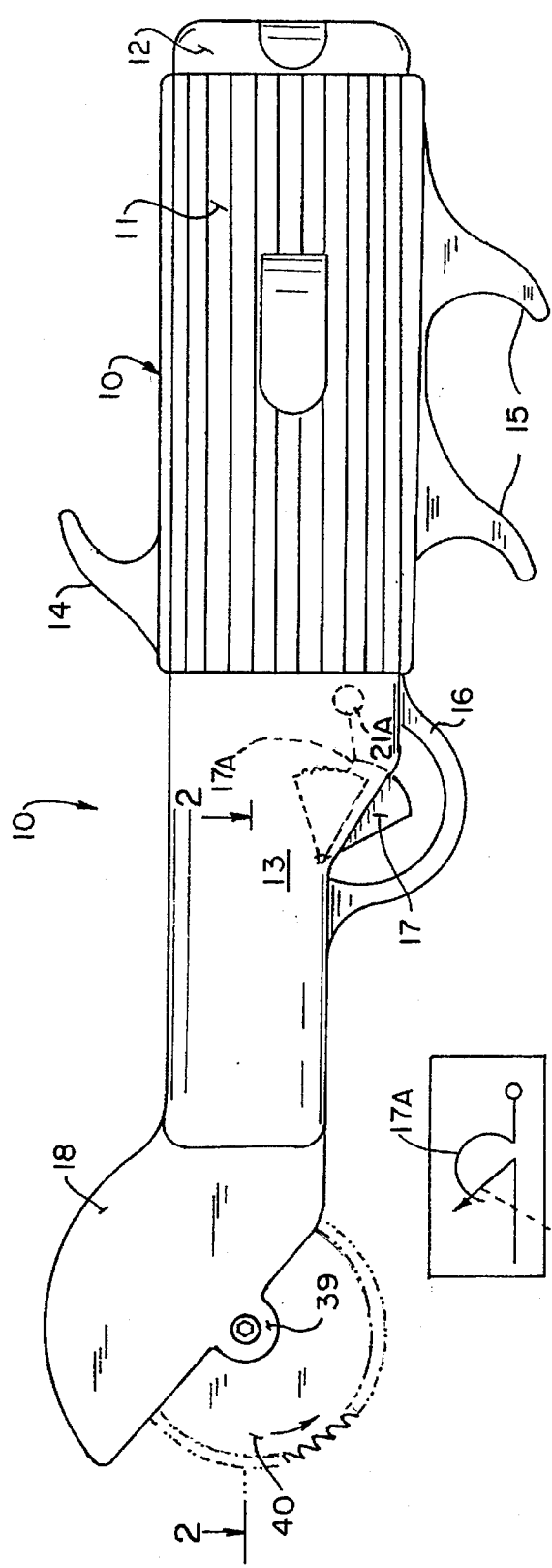
FIG.1
FIG.9
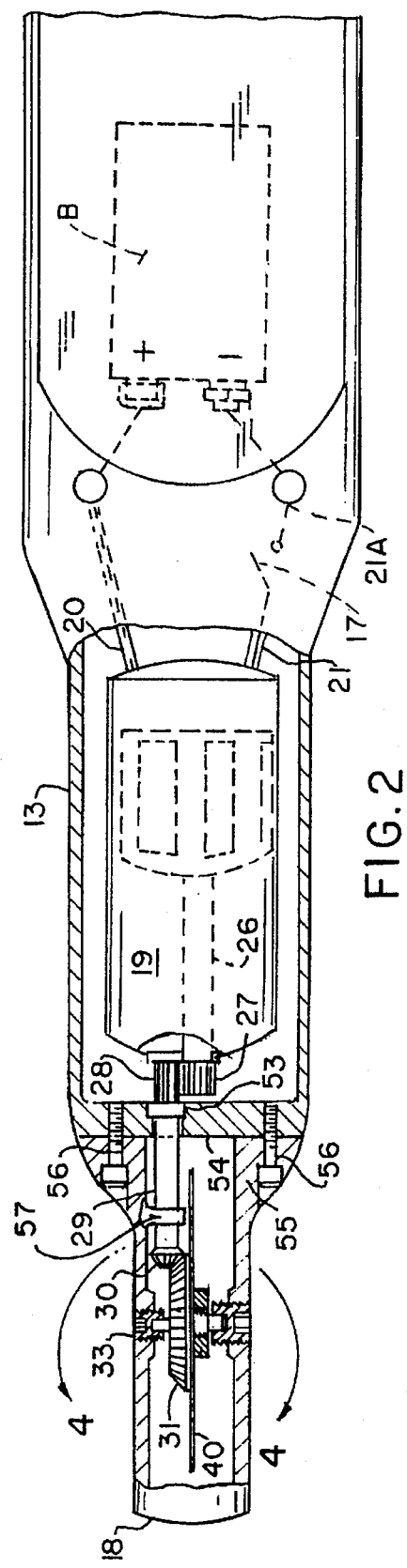
FIG.2

RECHARGEABLE UNIVERSAL DRYWALL CUTTER

This is a continuation application of application Ser. No. 08/228,386, filed on Apr. 15, 1994 now abandoned.

BACKGROUND OF THE INVENTION

1. Field of the Invention

This invention is directed to a hand-held power tool for cutting and shaping materials which include drywall construction sheets, wood stock of a reasonably thin character, siding sheets of wood, plastic and composition type material, as well as plastic and metal piping.

2. Description of the Prior Art

In considering the field of hand-held tools it appears that in handling drywall materials the installers use short cuts by scoring where a break is desired, followed by breaking the sheet material, or by using power driven routers that produce clean cuts. Tools for cutting and shaping material include utility knives, hand operated saws, and bench mounted cutting devices, all of which are well known in the arts.

The invention has an important object to provide a battery powered, light weight tool to facilitate an individual in preparing drywall sheets for installation.

It is an object to provide a battery powered tool having a wide application for driving cutters with a minimum of driving mechanisms making the tool light weight and convenient for hand-held operations.

It is an object to provide a small size hand-held tool that is easy to manipulate to produce accurate results in cutting and shaping materials, including adjustable guard means to regulate depth of cut.

A further object is to provide a portable hand-held and speed controlled battery powered utility cutting tool that is simple to manufacture at low cost.

Other objects will be brought out in the following description of a tool that exemplifies a preferred embodiment of operating components.

BRIEF DESCRIPTION OF THE DRAWINGS

The best mode of construction for the present tool is illustrated in the following drawings wherein:

FIG. 1 is a side elevation view of the tool assembly;

FIG. 2 is an enlarged fragmentary section view of the tool as seen along line 2—2 in FIG. 1;

FIG. 9 is a brief diagram of the current control slider and switch arm.

DETAILED DESCRIPTION OF THE INVENTION

Figure 3:
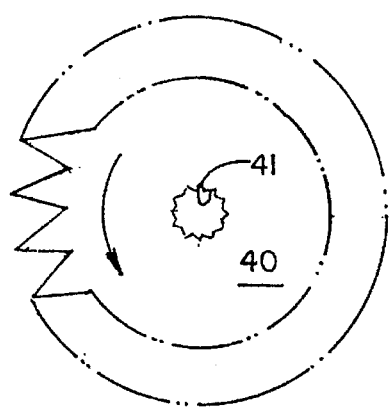
FIG. 3 is an enlarged view of a rotary cutting blade setting forth the cutter teeth configuration.

FIG. 1 is a side view of the body of a preferred power tool T having a handle 10 for manipulating the tool, the handle being covered with a non-slip sleeve 11 shaped to receive standard nickel-cadmium rechargeable batteries (not shown). The base end 12 of the handle 10 has a removable clip-on cover to retain a suitable onboard battery for operating a motor mounted in a housing extension 13 formed on the handle 10. For convenience in holding the tool, the handle is formed with a top finger 14, a pair of bottom fingers 15, and a guard 16 for a speed control switch element 17. The forward end of the extension 13 handle has supports a cutter blade guard 18 which is adapted to receive a shaft and gear assembly for driving rotary cutting disc which is interchangeable with other types of cutting discs to be referred to below.

Figure 4:
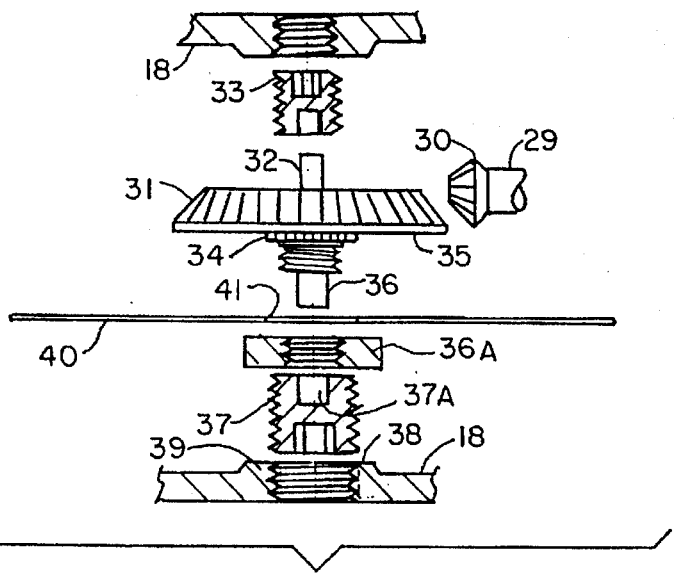
FIG. 4 is an enlarged fragmentary sectional view of the mounting of a rotary cutter in the tool, the exploded view being taken along line 4—4 in FIG. 2.

FIG. 2 is an enlarged fragmentary sectional view of the motor housing 13 and the drive mechanism for a cutting disc. The motor 19 is provided with current input contacts 20 and 21 connected through well-known circuit means depicted in FIG. 1 which includes the switch 17 normally in circuit open position so the user of the tool must actuate the current slide 17A for the switch 17 to apply current from a battery to the motor 19. The motor drives a shaft 26 for driving the power take-off gear 27 which meshes with a power input gear 28 on drive shaft 29. Depending on the motor to disc rotational speed ratio, the gears 27 and 28 may be designed to provide the desired ratio of speed for the shaft 29, and the direction of rotation of the cutter 40 will be determined to be counterclockwise as shown by the arrow. In view of the limited space available in the guard 18, the drive shaft 29 is positioned to line up at one side of the motor shaft 26 and at one side of the bevel gear 31 so that a close alignment is achieved between the motor shaft 26 and the plane of the cutter disc 40. Thus the view of FIG. 2 clearly shows the compact alignment in which shaft 29 positions the cutter disc 40 in alignment with the power output shaft 26. The drive shaft 29 drives a first bevel gear 30 which engages with a larger second bevel gear 31 which brings the cutter disc 40 into alignment with the shaft 26. That second bevel gear 31, as seen in FIGS. 2 and 4, is mounted on a rotary shaft 32 having one end supported in a bearing 33 carried by the guard 18. Depending on the speed ratio at gears 27 and 28, the final speed for the shaft 32 can be selected by choice of the bevel gears to result in reaching a cutter speed of 1000 RPM. Shaft 32 is in driving support for the second bevel gear 31. The second bevel gear 31 is formed with a circular shoulder 34 on its back face 35, and a stub shaft 36 projects beyond the circular shoulder 34. The base of stub shaft 36 is threaded to receive a threaded element 36A which presses the cutter disc 40 with its aperture 41 seated on the shoulder 34. That stub shaft 36 is supported by a removable bearing 37 having a socket to receive the stub shaft 36. The bearing 37 is threaded through a threaded socket 38 which is an enlargement on the support extension 39 formed on the guard 18 and is the last part to be threaded through the guard tab 39 to catch the stub shaft 36 in its socket 37A.

A rotary cutter 40 seen in FIGS. 1 and 3 is formed with a center opening 41 that fits over the shoulder 34 on the second bevel gear 31. Both the opening 41 and the shoulder 34 have suitable roughened peripheral circumferences that are adapted to seat so rotation of the bevel gear 31 will drive the cutter 40. The form of the cutting teeth on the cutter 40 is shaped for cutting drywall material. The body of the cutter 40 may be stainless steel having a thickness of approximately one-sixty-fourth inch, while the teeth 42 have a cutting edge length of about one-half inch. For extended life of the cutting teeth 42, the tips are formed with carbide surface.

Figure 5:
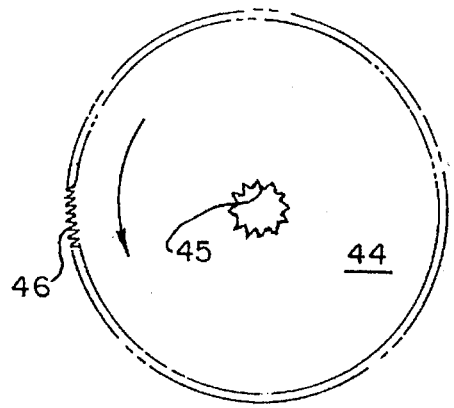
FIG. 5 is a view of a rotary cutter blade for cutting metallic material.

Alternate cutting discs are illustrated, wherein FIG. 5 is a disc 44 having a center aperture 45 formed with an interior surface for meshing with the shoulder 34 on the back face of the second bevel gear 31. The cutting teeth 46 are formed from carbon steel and sheet steel and aluminum material. The teeth 46 are of a medium size, but may be finer or coarser, depending on the material to be cut.

Figure 6:
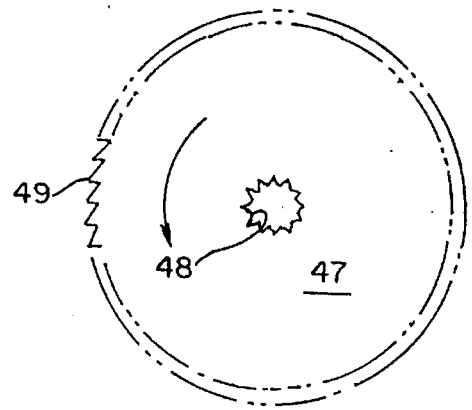
FIG. 6 is a view of a rotary cutter blade for cutting plastic materials.

The disc 47 seen in FIG. 6 also has a center aperture 48 to mesh with the shoulder 34 on the back face of the second bevel gear 31. The teeth 49 have a configuration similar to the teeth on disc 40 which is suitable for cutting plastics, PVC pipe, vinyl siding material, and wood having a thickness of about one-fourth inch thick.

Figure 7:
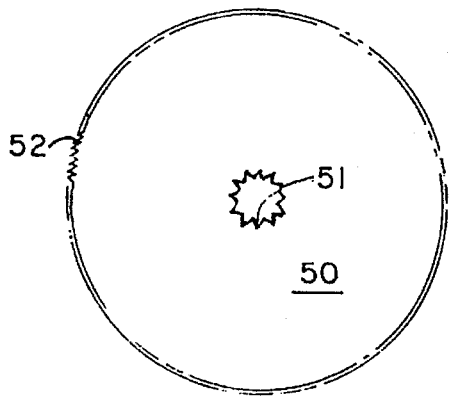
FIG. 7 is a view of a cutter blade similar to FIG. 6 but with fine tooth configuration.

Another disc 50 seen in FIG. 7 is formed with the mounting aperture 51, just like the previous center apertures 45 or 48. In this case the teeth 52 are quite fine or small and close set which duplicates to some extent the tooth size and spacing for the disc 44.

The general configuration of the body of the tool is suitable for current types of batteries of up to about 9 volts which is suitable for a variable speed motor 19. FIG. 1 depicts the speed control on the motor by the position of the control switch element 17 which progressively removes the resistance 17A in the battery circuit so full voltage is applied to the motor 19 when the switch 17 is fully depressed. In mounting the motor 19 in the housing extension 13 suitable supports are employed to hold the motor drive gear 27 in a fixed position so it is able to have a meshed contact with the gear 28 on shaft 29 supported in brackets 53, one being positioned in the forward wall 54 of extension 13 and the other bracket being in the guard 18. The driven shaft 29 projects into the guard 18 which partially covers a cutting disc. The guard 18 has a flared base end 55 that is removably secured by screws 56 into the wall 54 at the forward end of the extension 13.

The motor 19 seen in FIG. 2 may be a DC subfractional motor supplied by Buehler Products, Inc., or the equivalent. Such a motor is equipped with built-in speed regulation.

Figure 8:
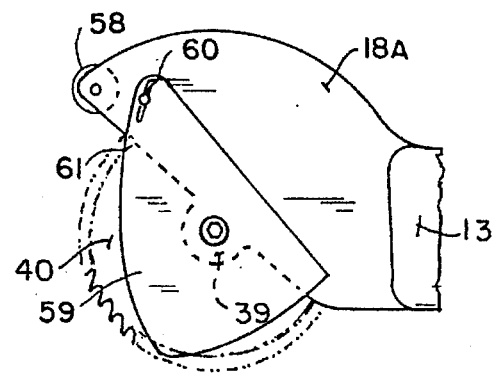
FIG. 8 is a modified view of the cutter guard with depth of cut control means and roller support.

When the tool of FIG. 1 is to be used to score a drywall sheet, a modified guard 18A seen in FIG. 8 can be used. The modified guard 18A is provided with a roller 58 to make the tool easy to roll along the drywall sheet or other material. In addition, a depth of cut control guide 59 is adjustably mounted on the guard 18A by a wing nut 60 that can be tightened up after the guide 59 has been adjusted so its edge 61 has exposed the cutter 40 to a desired depth of cut permitted by the edge 61 sliding along the material with the roller 53 in contact.

The important overall features of the tool are its light weight, convenience, low cost, versatility, utility, and ease of use. As shown in the drawings of FIGS. 1 and 2 the assembly of the tool components assumes an inline relation from the handle 10 housing a dry-cell battery to the axially extending housing 13 for motor 19 and the axially aligned guard 18. These components are seen to be progressively reduced in size to accommodate the compact gear assembly which allows the rotary cutter blade 40 to be mounted in the guard 18 so straight-line force on the handle 10 is effectively applied to the cutter blade 40 with no laterally directed force.

This alignment of the components, as clearly shown in FIG. 2, allows the tool cutter blade 40 to enter narrow or confined areas which is a distinct advantage. This product could enable a carpenter, drywall hanger, roofer, siding installer, or another tradesman to produce quick, accurate, smooth cuts in drywall, thin lumber, metal, plastic, and other materials. Its small size, light weight, and cordless design make it extremely easy to handle and permit it to be unobtrusively carried on a tool belt. These features could enable it to help improve the productivity and quality of work capable of being produced by its user.

While the preferred embodiments of the tool are disclosed, it is understood that the invention may include a reasonable variation of structure that is suggested by the disclosure.

What is claimed is:

1. A hand held material cutting tool comprising:

a) an elongated body with a handle portion at one end for manipulating the hand held cutting tool, said body having an axially directed fixed housing extension at an opposite end from said handle portion;

b) a battery operated motor and a motor shaft each carried in said axially directed fixed housing extension, said motor shaft having a drive gear fixed in said axially directed fixed housing extension remote from said handle portion;

c) a hollow guard fixed on said axially directed fixed housing extension, said guard having an opening facing material to be cut;

d) a material cutter disc and a disc drive gear assembly each operably carried by said hollow guard, said cutter disc being received in said opening of said guard and having a portion which protrudes through said opening to present said cutter disc to material to be cut, said cutter disc lying in a plane which is substantially in alignment with an axis of said motor shaft;

e) a drive shaft extending from said drive gear in said fixed housing extension to said disc drive gear assembly located in said hollow guard, said drive shaft having a first gear meshing with said drive gear fixed in said fixed housing extension and a second gear meshing with said disc drive gear assembly; and f) a battery carried in said handle portion and connected to said battery operated motor.

2. The material cutting tool set forth in claim 1 wherein said disc drive gear assembly includes removable bearings carrying said cutter disc in said guard to permit the cutter disc to be replaced.

3. The material cutting tool set forth in claim 1 wherein a depth of cut member is carried by said guard adjacent said guard opening in a position to engage material to limit the depth of cut into the material.

4. The material cutting tool set forth in claim 3 wherein said depth of cut member is adjustable on said guard.

* * * * *